(12) United States Patent
Weibel et al.

(10) Patent No.: US 7,936,259 B1
(45) Date of Patent: May 3, 2011

(54) ALARM MANAGEMENT SYSTEM

(75) Inventors: Robert Weibel, Georgetown, TX (US);
Douglas Rothenberg, Shaker Heights, OH (US)

(73) Assignee: Tips Incorporated, Georgetown, TX (US)

( * ) Notice: Subject to any disclaimer, the term of this patent is extended or adjusted under 35 U.S.C. 154(b) by 300 days.

(21) Appl. No.: 12/337,346

(22) Filed: Dec. 17, 2008

(51) Int. Cl.
*G08B 29/00* (2006.01)

(52) U.S. Cl. ........ 340/506; 340/507; 340/511; 340/517; 340/521; 340/522

(58) Field of Classification Search .................. 340/506, 340/507, 511, 517, 521, 522
See application file for complete search history.

(56) References Cited

U.S. PATENT DOCUMENTS 5,400,246 A * 3/1995 Wilson et al. .................. 700/17
7,289,935 B1 10/2007 Hugo

* cited by examiner

*Primary Examiner* — Daryl Pope
(74) *Attorney, Agent, or Firm* — Buskop Law Group, PC; Wendy Buskop

(57) ABSTRACT

The present embodiments generally relate to an alarm management system for providing a time to manage value enabling a user to respond to an abnormal situation for at least one device and prevent the at least one device from reaching a trouble point value.

18 Claims, 3 Drawing Sheets

ALARM MANAGEMENT SYSTEM

FIELD

The present embodiments generally relate to an alarm management system for providing a time to manage value enabling a user to respond to an abnormal situation for at least one device and prevent the at least one device from reaching a trouble point value.

BACKGROUND

Current industrial processes are monitored and controlled by computers. These computers monitor process conditions through sensors that relay hundreds to thousands of process measurements to computers. Each measurement is associated with one or more established alarm limits. A common problem in many industrial processes is that many alarms from different measurements may occur close to one another in time. A high frequency of alarms can overcome an operator, causing the operator to lose their effectiveness at controlling the process. A need exists for an alarm system that allows a process operator time to manage process upsets.

In addition, prior art alerts for abnormal processes conditions use a single alert for all abnormal situations. This requires time for the operator to detect and diagnose the abnormal situation. A further need exists for a system that effectively alerts the operator to true abnormal situations in a process within an appropriate time to manage the abnormal situation.

The present embodiments of the alarm management system disclosed below meet these needs.

BRIEF DESCRIPTION OF THE DRAWINGS

The detailed description will be better understood in conjunction with the accompanying drawings as follows.

Figure 1:
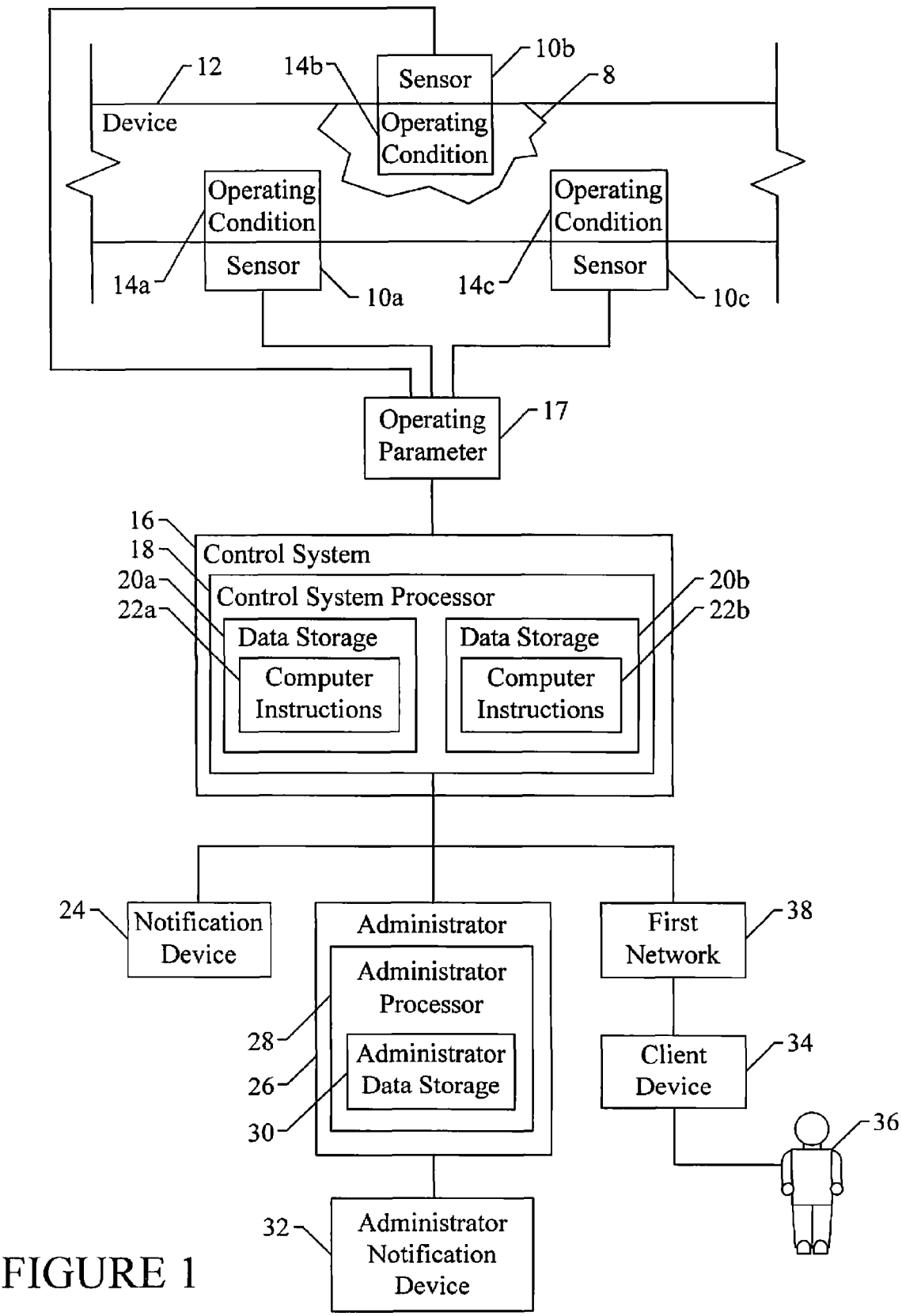
FIG. 1 depicts an embodiment of an alarm management system.

The present embodiments are detailed below with reference to the listed Figures.

DETAILED DESCRIPTION OF THE EMBODIMENTS

Before explaining the present system in detail, it is to be understood that the apparatus is not limited to the particular embodiments and that it can be practiced or carried out in various ways.

The current invention simplifies current alarm systems. Current alarm systems require the separate step of calculating a proper alarm activation point. The current invention simplifies the alarm system by having this calculating functionality integrated into the software of the alarm system.

The present embodiments generally relate to an alarm management system for providing a time to manage value enabling a user to respond to an abnormal situation for at least one device and prevent the at least one device from reaching a trouble point value.

The at least one device can be a system, or a plurality of connected devices, such as an alarm system, a tank, a pipe, a pump, a motor, other computer calculations or combinations thereof.

The trouble point value can be a detected value associated with the device that exceeds above or falls below the preset limit and when the device operates at the trouble point value, the abnormal situation can cause a consequence associated with the at least one consequential parameter.

The consequential parameter can be a member of the group consisting of: safety parameters; financial parameters; environmental parameter; quality parameters, and combinations thereof.

The operating parameter can be flow rates, vapor pressures, positive or negative pressures, water levels, and similar material specifications.

The system can further comprise at least one sensor for monitoring the operating condition concerning the device. The sensor can be an analog sensor, a digital sensor, a pressure sensor, a temperature sensor, a vapor pressure sensor, an electric resistance sensor, flow rate sensor, fluid density sensor, and combinations thereof. In an embodiment the system can contain at least one sensor, but in additional embodiments multiple sensors can be used.

The operating condition can be the entire range at which the sensor can operate. The device may not be able to operate in the entire range due to physical limitations therefore the operating condition can usually be the device design limits, including normal and abnormal operating conditions.

The system can further comprise a control system for monitoring at least one operating parameter using the at least one monitored operating conditions from the at least one sensor. The control system can further comprise a control system processor associated with at least one data storage.

The data storage can contain computer instructions to instruct the processor to provide at least one alarm activation when the at least one parameter for the device exceeds or falls below the at least one operating parameter. The data storage can further contain computer instructions for notifying at least one member of the group consisting of a notification device in communication with the control system processor for alerting a user with the at least one alarm activation, an administrator, a client device associated with a user in communication with the control system processor via a first network.

The control processor can be stand alone or redundant, open or closed loop, monitor only or contains logic to provide feedback to a final control device, or combinations thereof.

A final control device that can be usable in the embodiments can be a valve or heater.

The administrator can be an administrator processor associated with administrator data storage and an administrator notification device.

The notification device can be a computer monitor adapted to display a message, a flashing light, an audio signal, a physical touch indicator or combinations thereof. Examples of an audio signal can include a siren, flashing lights, strobe lights, and combinations thereof. A physical touch can be a chair vibration, an electric shock, or combinations thereof.

The alarm activation can be determined by multiplying a rate of change for at least one operating parameter by a time to manage value for the abnormal situation forming a first product and then subtracting or adding the first product from a trouble point value associated with at least one consequential parameter.

The alarm management system can be a system, or a plurality of connected devices.

The system can be an automated manufacturing environment, a smart pallet, a pipeline, a tank, another computer, or any other device that would fail because of exceeding or falling beneath preset operating conditions that can be detected.

The system can further comprise a method for forming at least one alarm activation to continuously monitor a device comprising the steps of identifying the device to a control system.

The embodiments can comprise an additional step for determining the operating parameters for the device.

The embodiments can comprise an additional step for inputting the operating parameter to the control system.

The embodiments can comprise an additional step for inputting a rate of change for each operating parameter to an administrator in communication with the control system, wherein the rate of change can be based on a type of signal from a sensor monitoring the one device.

The embodiments can comprise an additional step for inputting the consequential parameters to the administrator for each alarm activation.

The embodiments can comprise an additional step for identifying at least one trouble point value associated with the consequential parameter for each abnormal situation associated with each device.

The embodiments can comprise an additional step for inputting trouble point values for each alarm activation to the administrator.

The embodiments can comprise an additional step for determining a time to manage value for each trouble point value and inputting each time to manage value to the administrator.

The embodiments can comprise an additional step for calculating the alarm activation by multiplying the time to manage value by a rate of change forming a first product, and then subtracting or adding the first product from the trouble point value associated with the at least one consequential parameter and save at data storage at the administrator.

The embodiments can comprise an additional step for inputting the alarm activation to the control system.

The embodiments can comprise an additional step for monitoring sensors with the control system using the alarm activation.

The embodiments can comprise an additional step for notifying with the control system, a user, administrator, or combinations thereof when an abnormal situation is present.

A user can be a person, an administrator, an alarm or security company, a police or fire department, an operator, an engineer, another computer or computer system, or combinations thereof.

The time to manage value can comprise a time to perform corrective action with corrective action tools to cause the abnormal situation to stop, and a time to allow the at least one device to return to a normal operating condition.

The time to manage value can further comprise a member of the group consisting of time to view the abnormal situation, time to collect tools to verify the existence of the abnormal situation, time to verify the abnormal situation using the collected tool, and time to collect corrective action tools to implement corrective action to cause the abnormal situation to stop and combinations thereof.

Turning now to the Figures, FIG. 1 depicts an embodiment of an alarm management system.

A device (12) is shown with at least one sensor (10a, 10b, 10c) for monitoring at least one operating condition (14a, 14b, 14c).

A control system (16) for monitoring at least one operating parameter (17) is shown using the monitored operating conditions (14a, 14b, 14c) from the sensors (10a, 10b, 10c).

The control system (16) can comprise a control system processor (18) associated with at least one data storage (20a, 20b). Each data storage can have computer instructions (22a, 22b) to instruct the control system processor (18) to provide at least one alarm activation when the at least one operating parameter (17) for the device exceeds above or falls below the at least one operating parameter (17).

The control system processor (18) can also be associated with at least one data storage (20a, 20b) with computer instructions (22a, 22b) to instruct the control system processor (18) to notify a notification device (24), an administrator (26) and a client device (34) associated with a user (36).

The notification device (24) can be in communication with the control system processor for alerting a user with the at least one alarm activation.

The administrator (26) can comprise an administrator processor (28) associated with administrator data storage (30). It is also contemplated that the administrator can communicate with an administrator notification device (32).

The client device (34) can be associated with a user (36) in communication with the control system processor via a first network (38).

Figure 2:
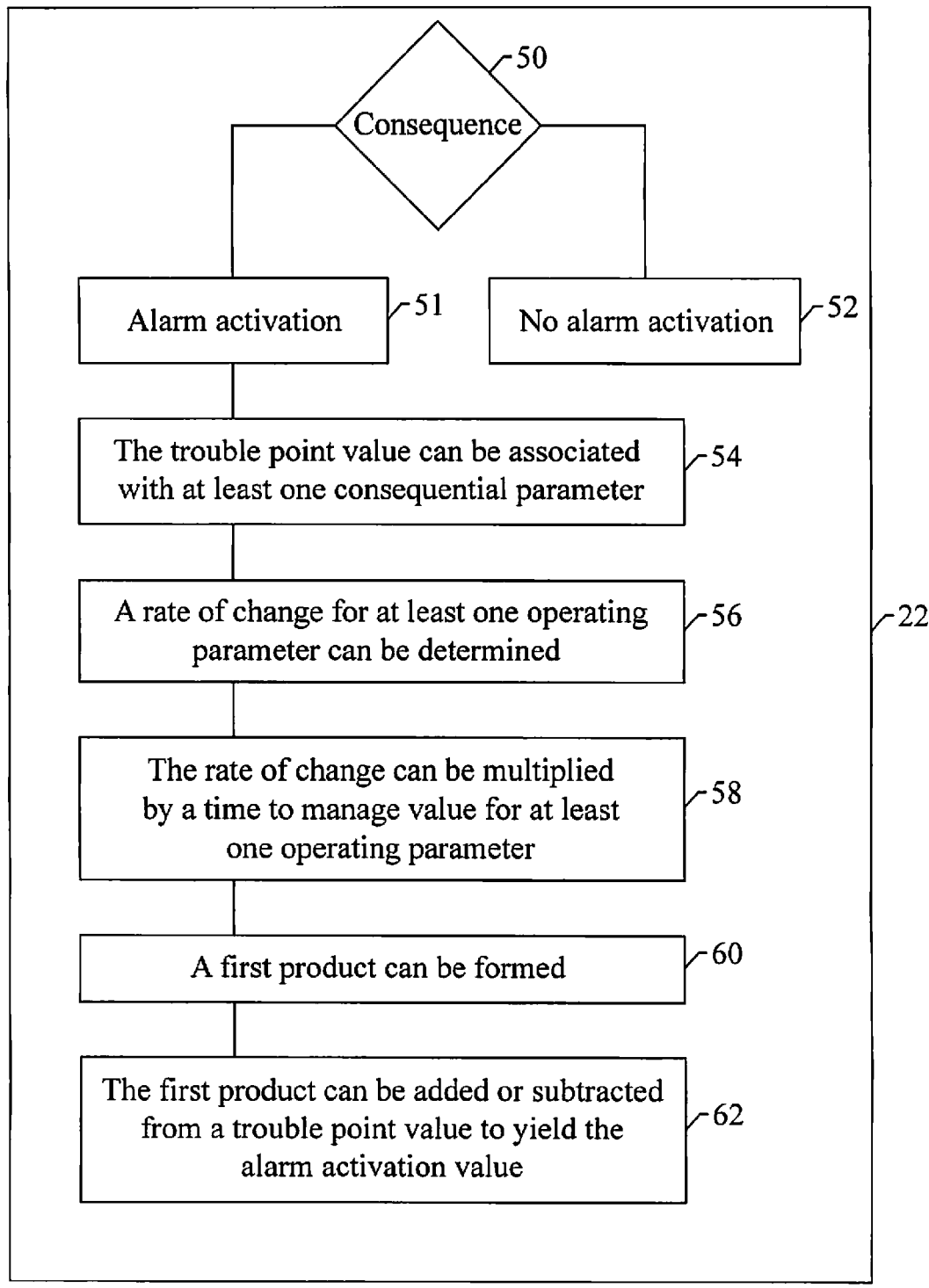
FIG. 2 depicts an embodiment of computer instructions to calculate an alarm limit.

FIG. 2 depicts an embodiment of computer instructions (22). In this embodiment the following steps are depicted:

In the first step (50), a consequence can be determined whether to activate an alarm or not to activate an alarm. If a consequence is not determined, no alarm is activated, as shown as step (52). If an alarm is activated, it is reflected at step (51).

In the second step (54), if an alarm is activated, the trouble point value can be associated with at least one consequential parameter.

In the third step (56), a rate of change for at least one operating parameter can be determined.

In the fourth step (58), the rate of change determined in the third step (56), can be multiplied by a time to manage value for at least one operating parameter can be determined.

In the fifth step (60), a first product can be formed by taking the result of the fourth step (58) by multiplying the rate of change value by the time to manage value.

In the sixth step (62), the first product determined in the fifth step (60), can be added or subtracted from a trouble point value to yield the alarm activation value.

Figure 3:
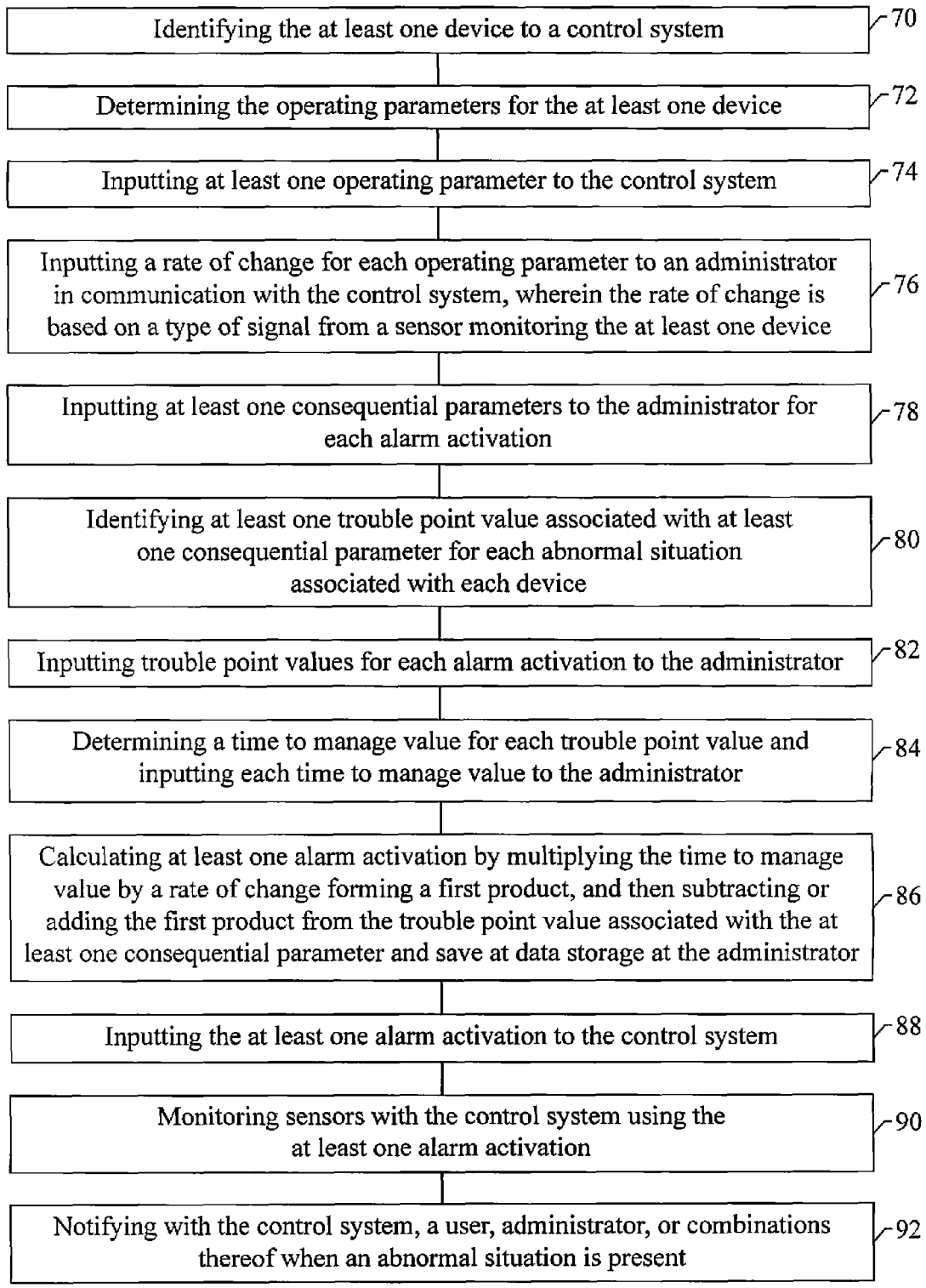
FIG. 3 depicts a flow diagram of an embodiment of the method usable with the invention.

FIG. 3 depicts a flow diagram of an embodiment of the method usable with the invention.

At step (70), at least one device to a control system can be identified.

At step (72), operating parameters for the at least one device can be determined.

At step (74), at least one operating parameter can be input into the control system.

At step (76), a rate of change can be input for each operating parameter to an administrator in communication with the control system, wherein the rate of change is based on a type of signal from a sensor monitoring the at least one device.

At step (78), at least one consequential parameter can be input into the administrator for each alarm activation.

At step (80), at least one trouble point value can be identified and associated with at least one consequential parameter for each abnormal situation associated with each device.

At step (82), trouble point values for each alarm activation can be input into the administrator.

At step (84), a time to manage value can be determined for each trouble point value and inputting each time to manage value to the administrator.

At step (86), at least one alarm activation can be calculated by multiplying the time to manage value by a rate of change forming a first product, and then subtracting or adding the first product from the trouble point value associated with the at least one consequential parameter and save at data storage at the administrator.

At step (88), the at least one alarm activation can be input into the control system.

At step (90), sensors can be monitored with the control system using the at least one alarm activation.

At step (92), a user, administrator, or combinations thereof can be notified with the control system when an abnormal situation is present.

While these embodiments have been described with emphasis on the embodiments, it should be understood that within the scope of the appended claims, the embodiments might be practiced other than as specifically described herein.

What is claimed is:

1. An alarm management system for providing a time to manage value enabling a user to respond to an abnormal situation for a device and prevent the device from reaching a trouble point value, the alarm management system comprising:
   a. a sensor for monitoring an operating condition concerning the device;
   b. a control system for monitoring an operating parameter using the monitored operating condition from the sensor, wherein the control system comprises a control system processor associated with at least one data storage, and wherein the operating parameter is input into the control system;
   c. an administrator in communication with the control system, wherein the administrator comprises:
      (i) a rate of change for the operating parameter input therein;
      (ii) a consequential parameter for an alarm activation input therein, wherein the consequential parameter is a parameter associated with a consequence caused by the abnormal situation;
      (iii) the trouble point value associated with the consequential parameter for the abnormal situation input therein, wherein the trouble point value is a detected value of the operating condition associated with the device that exceeds above or falls below a preset limit of the operating parameter, and wherein when the device operates at the trouble point value the abnormal situation would cause the consequence associated with the consequential parameter; and
      (iv) the time to manage value for the trouble point value input therein, wherein the time to manage value is a time to perform a corrective action to cause the abnormal situation to stop, preventing the device from reaching the trouble point value; and
   d. computer instructions in the at least one data storage to instruct the control system processor to:
      (i) provide the alarm activation when the operating condition for the device exceeds or falls below the operating parameter based on an alarm activation value, wherein the alarm activation value is calculated and determined by:
         1. multiplying the rate of change for the operating parameter by the time to manage value for the abnormal situation forming a first product; and
         2. subtracting or adding the first product from the trouble point value associated with the consequential parameter, wherein the alarm activation is input within the control system; and
      (ii) notify at least one member of the group consisting of: a notification device in communication with the control system processor for alerting a user with the alarm activation, the administrator, and a client device associated with a user in communication with the control system processor via a first network.

2. The alarm management system of claim 1, wherein the device is a system or a plurality of connected devices.

3. The alarm management system of claim 1, wherein the consequential parameter is a member of the group consisting of: a safety parameter, a financial parameter, an environmental parameter, a quality parameter, and combinations thereof.

4. The alarm management system of claim 1, wherein the administrator comprises an administrator processor associated with an administrator data storage and an administrator notification device.

5. The alarm management system of claim 1, wherein the notification device is a computer monitor adapted to display a message, a flashing light, an audio signal, a physical touch indicator, or combinations thereof.

6. The alarm management system of claim 1, wherein the sensor is an analog sensor, a digital sensor, or combinations thereof.

7. The alarm management system of claim 6, wherein the sensor is a pressure sensor, a temperature sensor, a vapor pressure sensor, an electric resistance sensor, a flow rate sensor, a fluid density sensor, or combinations thereof.

8. The alarm management system of claim 1, wherein the operating parameter comprises flow rates, vapor pressures, positive or negative pressures, water levels, and similar material specifications.

9. The alarm management system of claim 1, wherein the device comprises an automated manufacturing environment, a smart pallet, a pipeline, a tank, a computer, an alarm system, a pump, a motor, or any other device that would fail because of exceeding above or falling beneath the preset limit.

10. A method for forming an alarm activation to continuously monitor a device, the method comprising:
   a. identifying the device to a control system;
   b. determining an operating parameter for the device;
   c. inputting the operating parameter to the control system;
   d. inputting a rate of change for the operating parameter to an administrator in communication with the control system, wherein the rate of change is based on a type of signal from a sensor monitoring an operating condition concerning the device;
   e. determining a consequence caused by an abnormal situation, wherein the consequence is associated with a consequential parameter, and inputting the consequential parameter into the administrator for the alarm activation;
   f. identifying a trouble point value associated with the consequential parameter for the abnormal situation associated with the device, wherein the trouble point value is a detected value of the operating condition associated with the device that exceeds above or falls below a preset limit of the operating parameter, and wherein when the device operates at the trouble point value the abnormal situation would cause the consequence associated with the consequential parameter;
   g. inputting the trouble point value for the alarm activation to the administrator;
   h. determining a time to manage value for the trouble point value and inputting the time to manage value to the administrator, wherein the time to manage value is a time to perform a corrective action to cause the abnormal situation to stop, preventing the device from reaching the trouble point value;
   i. calculating the alarm activation by multiplying the time to manage value by the rate of change forming a first product, and then subtracting or adding the first product from the trouble point value associated with the consequential parameter;

j. inputting the alarm activation to the control system;

k. monitoring the sensor with the control system using the alarm activation; and l. notifying with the control system: a user, the administrator, or combinations thereof when the abnormal situation is present.

11. The method of claim 10, wherein the time to manage value further comprises a member of the group consisting of: time to view the abnormal situation, time to collect tools to verify an existence of the abnormal situation, time to verify the abnormal situation using the collected tool, time to collect corrective action tools to implement the corrective action to cause the abnormal situation to stop, and combinations thereof.

12. The alarm management system of claim 8, wherein the operating condition is:
   a. an entire range at which the sensor operates; or
   b. design limits of the device including normal and abnormal operating conditions.

13. The alarm management system of claim 1, wherein the time to manage value further comprises a member of the group consisting of: time to view the abnormal situation, time to collect tools to verify an existence of the abnormal situation, time to verify the abnormal situation using the collected tools, time to collect corrective action tools to implement the corrective action to cause the abnormal situation to stop, and combinations thereof.

14. The alarm management system of claim 1, wherein the user is a person, an alarm company, a security company, a police department, a fire department, an operator, an engineer, a computer, a computer system, or combinations thereof.

15. The alarm management system of claim 1, wherein the rate of change is based on a type of signal from the sensor.

16. The method of claim 10, wherein the consequential parameter is a safety parameter, a financial parameter, an environmental parameter, a quality parameter, or combinations thereof.

17. The method of claim 10, wherein the operating condition is:
   a. an entire range at which the sensor operates; or
   b. design limits of the device including normal and abnormal operating conditions.

18. The method of claim 10, wherein the user is a person, an alarm company, a security company, a police department, a fire department, an operator, an engineer, a computer, a computer system, or combinations thereof.

* * * * *